(12) United States Patent
Kamasuka

(10) Patent No.: US 11,093,104 B2
(45) Date of Patent: Aug. 17, 2021

(54) ICON DISPLAY CONTROL APPARATUS THAT PREVENTS MESSY DISPLAY OF ICONS, METHOD OF CONTROLLING SAME, AND STORAGE MEDIUM

(71) Applicant: CANON KABUSHIKI KAISHA, Tokyo (JP)

(72) Inventor: Atsushi Kamasuka, Matsudo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/214,486

(22) Filed: Dec. 10, 2018

(65) Prior Publication Data

US 2019/0187878 A1 Jun. 20, 2019

(30) Foreign Application Priority Data

Dec. 19, 2017 (JP) .............................. JP2017-242856

(51) Int. Cl.
*G06F 3/048* (2013.01)
*H04N 1/00* (2006.01)
*G06F 3/0481* (2013.01)
*G06F 9/445* (2018.01)
*G06F 9/451* (2018.01)

(52) U.S. Cl.
CPC .......... *G06F 3/04817* (2013.01); *G06F 9/445* (2013.01); *G06F 9/451* (2018.02)

(58) Field of Classification Search
CPC ...... G06F 3/04818; G06F 9/451; G06F 9/445; G06F 3/048; G06F 3/04817; H04N 1/00389; H04N 1/00506; H04N 2201/3295; H04N 1/00501–00517
See application file for complete search history.

(56) References Cited

U.S. PATENT DOCUMENTS

| | | | |
|---|---|---|---|
| 9,015,628 B2* | 4/2015 | Kuroyanagi | G06F 8/38 715/835 |
| 2008/0141148 A1* | 6/2008 | Ogita | H04N 1/00464 715/762 |
| 2009/0150807 A1* | 6/2009 | George | G06F 3/0482 715/763 |
| 2009/0183116 A1* | 7/2009 | Murata | H04N 1/00389 715/810 |
| 2010/0122187 A1* | 5/2010 | Kunori | G06F 3/04845 715/762 |

(Continued)

FOREIGN PATENT DOCUMENTS

JP 2014075088 A 4/2014

*Primary Examiner* — Mahelet Shiberou
(74) *Attorney, Agent, or Firm* — Rossi, Kimms & McDowell LLP

(57) ABSTRACT

An icon display control apparatus that prevents messy display of icons. A predetermined extension application equipped with a function for receiving an instruction for executing processing via an operation on an icon associated with the processing is installed in the icon display control apparatus. A display control unit performs control of display of the icon on a console section. The display control unit controls whether or not to display the icon associated with the processing on the console section, based on whether or not a predetermined condition set for processing of the predetermined extension application is satisfied.

11 Claims, 15 Drawing Sheets

(56) References Cited

U.S. PATENT DOCUMENTS

| | | | | |
|---|---|---|---|---|
| 2011/0149315 A1* | 6/2011 | Yamazaki | ............ | H04N 1/0044 358/1.9 |
| 2012/0023451 A1* | 1/2012 | Kuroyanagi | .............. | G06F 8/38 715/835 |
| 2013/0097560 A1* | 4/2013 | Park | .................... | G06F 3/04817 715/811 |
| 2015/0085325 A1* | 3/2015 | Sato | ................... | H04N 1/00474 358/444 |
| 2015/0222787 A1* | 8/2015 | Sakiyama | .............. | H04N 1/393 358/3.28 |
| 2016/0259772 A1* | 9/2016 | Kato | ....................... | G06Q 10/10 |
| 2018/0048823 A1* | 2/2018 | Kang | ...................... | G06F 3/167 |
| 2019/0004679 A1* | 1/2019 | Hirasawa | .............. | G06F 3/0483 |

\* cited by examiner

FIG. 6

BASIC SETTINGS

- 601 — ICON NAME: FORM 1
- 602 — FORM DATA:
- 603 — ICON DISPLAY: ● CONDITIONAL DISPLAY    ○ PERMANENT DISPLAY
- 604 — DATA PRESENCE: ● ON    ○ OFF
- 605 — DELETE-AFTER-PRINTING: ● ON    ○ OFF
- 606 — DISPLAY-ONLY-SPECIFIC DATA: hoge.pdf

PRINT SETTINGS

607

| | |
|---|---|
| SHEET SIZE: | A4 ▼ |
| DOUBLE-SIDED: | SINGLE-SIDED ▼ |
| STAPLE SIDE: | LING SIDE ▼ |
| COLOR MODE: | AUTO ▼ |
| NUMBER OF COPIES | 1 |

608 — [REGISTER] [CANCEL]

| ICON NAME | ID | FORM DATA | PRINT SETTINGS | ICON IMAGE DATA | DISPLAY POSITION | ICON DISPLAY SETTING |
|---|---|---|---|---|---|---|
| FORM 1 | 0 | form1.dat | Settings1.dat | Icon1.dat | LEADING END | Settings1.dat |
| DELIVERY CUTFORM | 1 | form2.dat | Settings2.dat | Icon2.dat | TRAILING END | Settings2.dat |
| ISSUE FORM | 2 | form3.dat | Settings3.dat | Icon3.dat | TRAILING END | Settings3.dat |
| MANAGEMENT SECTION | 3 | form4.dat | Settings4.dat | Icon4.dat | LEADING END | Settings4.dat |

FIG. 10

| APPLICATION ID 1001 | ID 1002 | ICON TITLE 1003 | DISPLAY POSITION 1004 | ICON IMAGE INFORMATION 1005 |
|---|---|---|---|---|
| 1 | 0 | FORM 1 | LEADING END | PIXEL DATA OF Icon1.dat |
| 1 | 1 | ISSUE FORM | LEADING END | PIXEL DATA OF Icon2.dat |
| 2 | 2 | TODAY'S ADVERTISEMENT | LEADING END | PIXEL DATA OF Icon3.dat |

FIG. 13

BASIC SETTINGS

- 601 — ICON NAME: ADVERTISMENT
- 1301 — FILE PATH: 
- 603 — ICON DISPLAY: ● CONDITIONAL DISPLAY     ○ PERMANENT DISPLAY
- 604 — DATA PRESENCE: ● ON     ○ OFF
- 605 — DELETE-AFTER-PRINTING: ● ON     ○ OFF
- 606 — DISPLAY-ONLY-SPECIFIC DATA: Advertisement.pdf

PRINT SETTINGS

607

| | |
|---|---|
| SHEET SIZE: | A4 ▼ |
| DOUBLE-SIDED: | SINGLE-SIDED ▼ |
| STAPLE SIDE: | LING SIDE ▼ |
| COLOR MODE: | AUTO ▼ |
| NUMBER OF COPIES: | 1 |

608 — [ REGISTER ]  [ CANCEL ]

| ICON NAME | ID | FILE PATH | PRINT SETTINGS | ICON IMAGE DATA | DISPLAY POSITION | ICON DISPLAY SETTING |
|---|---|---|---|---|---|---|
| NOTICE | 0 | ¥¥main123¥center¥info | Settings1.dat | Icon1.dat | LEADING END | Settings1.dat |
| TODAY'S ADVERTISMENT | 1 | ¥¥main123¥east¥today¥ad | Settings2.dat | Icon2.dat | LEADING END | Settings2.dat |
| DAILY REPORT | 2 | ¥¥main123¥east¥report¥daily | Settings3.dat | Icon3.dat | TRAILING END | Settings3.dat |
| MONTHLY REPORT | 3 | ¥¥main123¥east¥report¥monthly | Settings4.dat | Icon4.dat | LEADING END | Settings4.dat |

1401

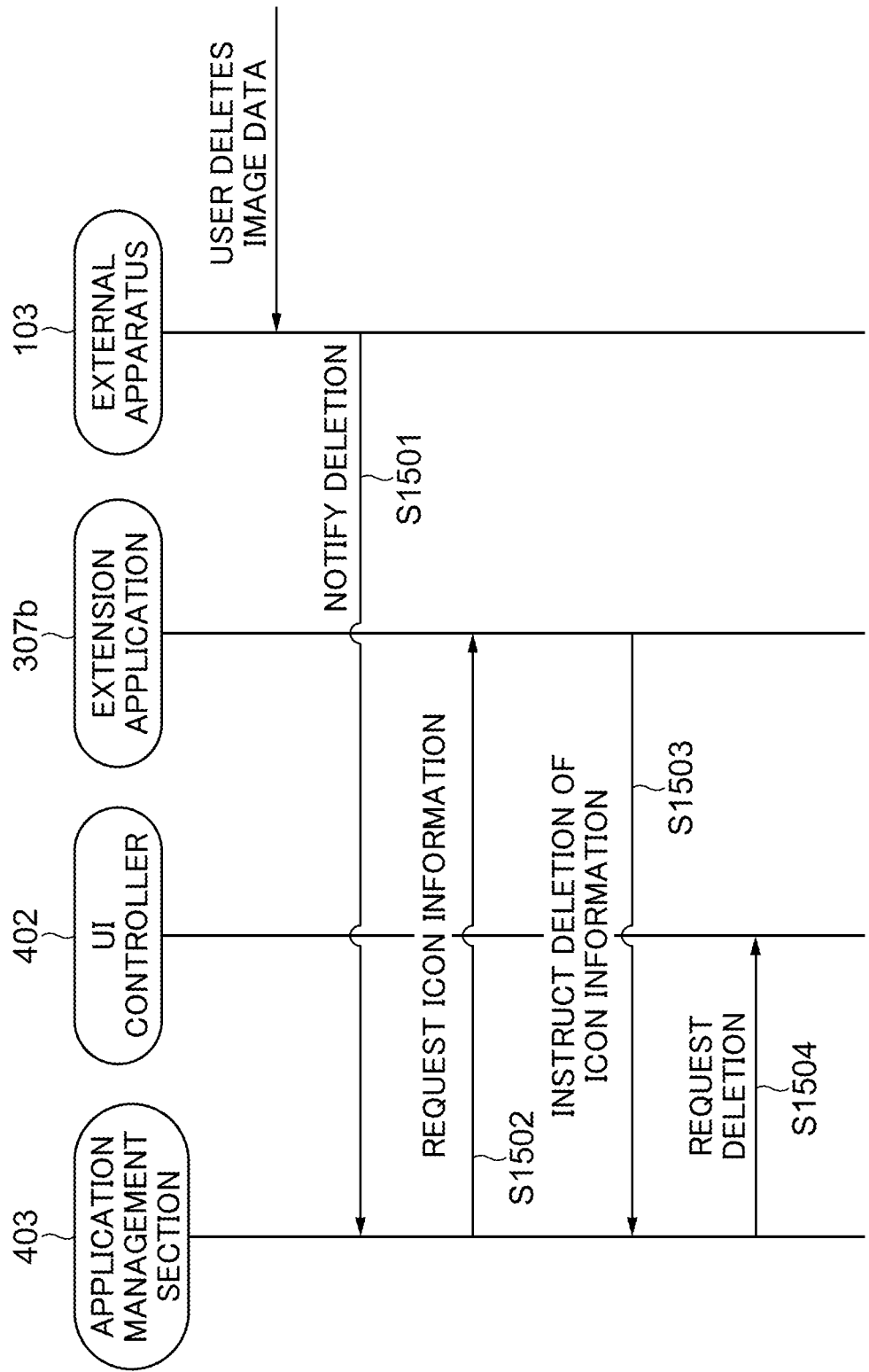

ICON DISPLAY CONTROL APPARATUS THAT PREVENTS MESSY DISPLAY OF ICONS, METHOD OF CONTROLLING SAME, AND STORAGE MEDIUM

BACKGROUND OF THE INVENTION

Field of the Invention

The present invention relates to an icon display control apparatus that prevents messy display of icons, method of controlling the same, and a storage medium.

Description of the Related Art

Conventionally, there has been known an MFP (Multi-Function Peripheral) as an icon display control apparatus in which applications for implementing standard functions, such as a copy function and a scan function, are installed in advance. A console section of the MFP displays icons for starting the applications, and the MFP starts an application associated with an icon selected by a user. Further, the MFP is capable of having an extension application installed thereon so as to extend an associated function. After the extension application is installed, an icon for starting the extension application is additionally displayed on the console section of the MFP (see e.g. Japanese Laid-Open Patent Publication (Kokai) No. 2014-75088).

Incidentally, the extension applications installed in the MFP include, for example, those equipped with one-touch execution function for accepting an instruction for starting printing of image data designated by a user in advance. In the MFP including such an extension application, there are generated a plurality of icons associated with respective different data items designated by the user, and all the generated icons are displayed on the console section.

However, when all the icons are displayed on the console section as described above, the display on the console section is messy. As a result, the user has a difficulty in finding a desired icon, which is inconvenient to the user.

SUMMARY OF THE INVENTION

The present invention provides an icon display control apparatus that prevents messy display of icons, a method of controlling the same, and a storage medium.

In a first aspect of the invention, there is provided an icon display control apparatus in which a predetermined extension application equipped with a function for receiving an instruction for executing processing via an operation on an icon associated with the processing is installed, comprising a display control unit configured to perform control of display of the icon on a console section, wherein the display control unit controls whether or not to display the icon associated with the processing on the console section, based on whether or not a predetermined condition set for processing of the predetermined extension application is satisfied.

In a second aspect of the invention, there is provided a method of controlling an icon display control apparatus in which a predetermined extension application equipped with a function for receiving an instruction for executing processing via an operation on an icon associated with the processing is installed, comprising performing control of display of the icon on a console section, wherein the control includes controlling whether or not to display the icon associated with the processing on the console section, based on whether or not a predetermined condition set for processing of the predetermined extension application is satisfied.

In a third aspect of the invention, there is provided a non-transitory computer-readable storage medium storing a computer-executable program for executing a method of controlling an icon display control apparatus in which a predetermined extension application equipped with a function for receiving an instruction for executing processing via an operation on an icon associated with the processing is installed, wherein the method comprises performing control of display of the icon on a console section, wherein the control includes controlling whether or not to display the icon associated with the processing on the console section, based on whether or not a predetermined condition set for processing of the predetermined extension application is satisfied.

According to the present invention, it is possible to prevent display on the console section from being messy.

Further features of the present invention will become apparent from the following description of exemplary embodiments (with reference to the attached drawings).

BRIEF DESCRIPTION OF THE DRAWINGS

FIG. 6 is a diagram showing an example of an icon configuration screen for an extension application installed in the MFP appearing in FIG. 1.

FIG. 7 is a diagram showing an example of icon management information managed by a storage control section appearing in FIG. 4.

FIG. 10 is a diagram showing an example of a display management table managed by the MFP appearing in FIG. 1.

FIG. 13 is an example of a variation of the icon configuration screen shown in FIG. 6.

FIG. 14 is a diagram showing a variation of the icon management information managed by the storage control section appearing in FIG. 4.

FIG. 15 is a sequence diagram showing a procedure of icon deletion processing performed by the printing system shown in FIG. 1.

DESCRIPTION OF THE EMBODIMENTS

The present invention will now be described in detail below with reference to the accompanying drawings showing embodiments thereof.

The following description is given of an MFP (Multi-Function Peripheral) as an icon display control apparatus according to an embodiment of the present invention. However, the present invention is not limited to the MFP. For example, the present invention may be applied to a tablet terminal, a PC, or any other like apparatus, insofar as it displays a plurality of icons and starts an application associated with one of the icons selected by a user.

Figure 1:
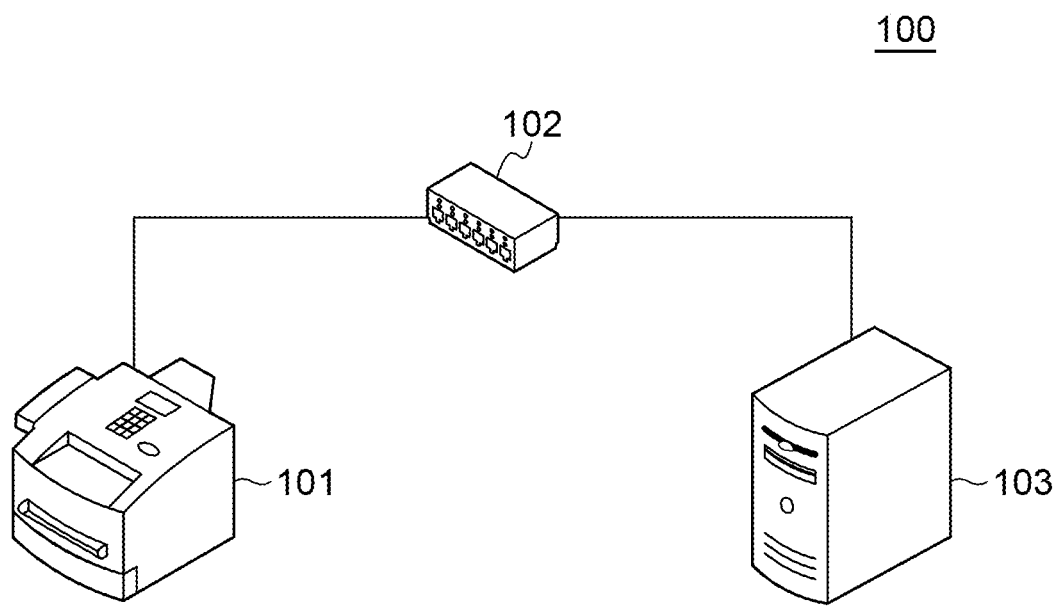
FIG. 1 is a network diagram of a printing system including an MFP as an icon display control apparatus according to an embodiment of the present invention.

FIG. 1 is a network diagram of a printing system 100 including the MFP, denoted by reference numeral 101, as the icon display control apparatus according to the embodiment. In FIG. 1, the printing system 100 is comprised of the MFP 101, a network router 102, and an external apparatus 103, and the MFP 101 is connected to the external apparatus 103 via the network router 102.

The MFP 101 has pre-installed thereon standard functions, such as a copy function, a FAX function, a scan function, and a scan image transmission function for transmitting a scanned image. A console section 206, described hereinafter, of the MFP 101 displays icons for starting the applications, and the MFP 101 starts an application associated with an icon selected by the user. Further, the MFP 101 is capable of having an extension application installed thereon so as to extend a function associated therewith. For example, when the MFP 101 receives an installation request for an extension application from the external apparatus 103, it performs installation processing for the extension application. Further, in response to an HTTP request received from the external apparatus 103, the MFP 101 sends back an HTTP response. In the present embodiment, the MFP 101 makes an inquiry about a status of an application to a Web service provided by the external apparatus 103 or the like, and switches display of an icon associated with the application according to a result of the inquiry. The network router 102 mediates communication between the MFP 101 and the external apparatus 103. The external apparatus 103 makes an installation request to the MFP 101 for installing an extension application, and connects to the MFP 101 using a browser so as to change settings of the extension application.

Figure 2:
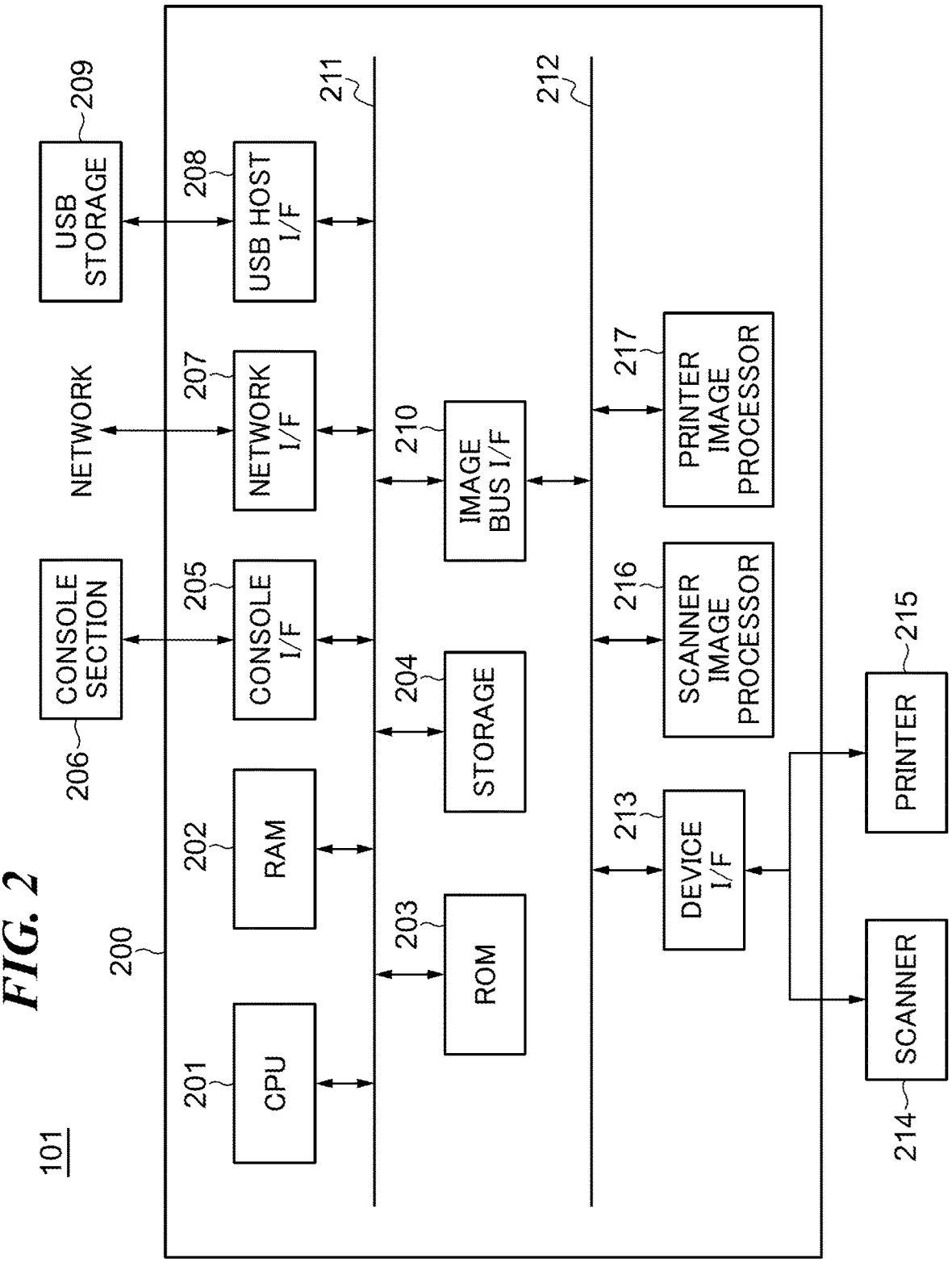
FIG. 2 is a schematic block diagram showing a hardware configuration of the MFP appearing in FIG. 1.

FIG. 2 is a block diagram showing a hardware configuration of the MFP 101 appearing in FIG. 1. In FIG. 2, the MFP 101 includes a controller unit 200, the console section 206, a USB storage 209, a scanner 214, and a printer 215. The controller unit 200 is connected to the console section 206, the USB storage 209, the scanner 214, and the printer 215. The controller unit 200 includes a CPU 201, a RAM 202, a ROM 203, a storage 204, a console interface 205, a network interface 207, a USB host interface 208, and an image bus interface 210. The controller unit 200 further includes a device interface 213, a scanner image processor 216, and a printer image processor 217. The CPU 201, the RAM 202, the ROM 203, the storage 204, the console section interface 205, the network interface 207, the USB host interface 208, and the image bus interface 210 are connected to each other via a system bus 211. The image bus interface 210, the device interface 213, the scanner image processor 216, and the printer image processor 217 are connected to each other via an image bus 212.

The controller unit 200 controls the console section 206, the USB storage 209, the scanner 214, and the printer 215 which are connected thereto. The CPU 201 executes a boot program stored in the ROM 203 to start an operating system (OS) 301 appearing in FIG. 3, referred to hereinafter, and performs various kinds of processing by executing programs stored in the storage 204 on the OS 301 thus started. The RAM 202 is used as a work area for the CPU 201, and as a temporary storage area of image data and the like. The ROM 203 stores the boot program and other programs executed by the CPU 201. The storage 204 stores programs for operating applications, image data, etc. The console section interface 205 sends out information input by the user on the console section 206. The console section 206 includes a touch panel display and a plurality of operation keys, and receive instructions input by the user. The network interface 207 is for interconnecting between the MFP 101 and a LAN. The USB host interface 208 is for communicating with the USB storage 209 and sends out data stored in the storage 204 to the USB storage 209 so as to store the data therein. Further, the USB host interface 208 receives data stored in the USB storage 209 and transfer the received data to the CPU 201. The USB storage 209 is removably attached to the USB host interface 208. Note that a plurality of USB devices including the USB storage 209 can be connected to the USB host interface 208.

The image bus interface 210 is a bus bridge for data format conversion, and connects between the system bus 211 and the image bus 212. The image bus 212 is implemented by a PCI bus, an IEEE 1394 bus or the like, and transfers image data at high speed. Connected to the device interface 213 are the scanner 214 which is an image input device and the printer 215 which is an image output device, and the device interface 213 performs synchronous and asynchronous conversion of image data. The scanner 214 reads an original placed on a platen glass, not shown, and generates image data based on information read from the original. The printer 215 performs printing of image data generated by the scanner 214 and other image data. The scanner image processor 216 corrects, processes, or edits image data generated by the scanner 214. The printer image processor 217 performs correction, resolution conversion, and the like on image data to be transferred to the printer 215, according to the printer 215.

Figure 3:
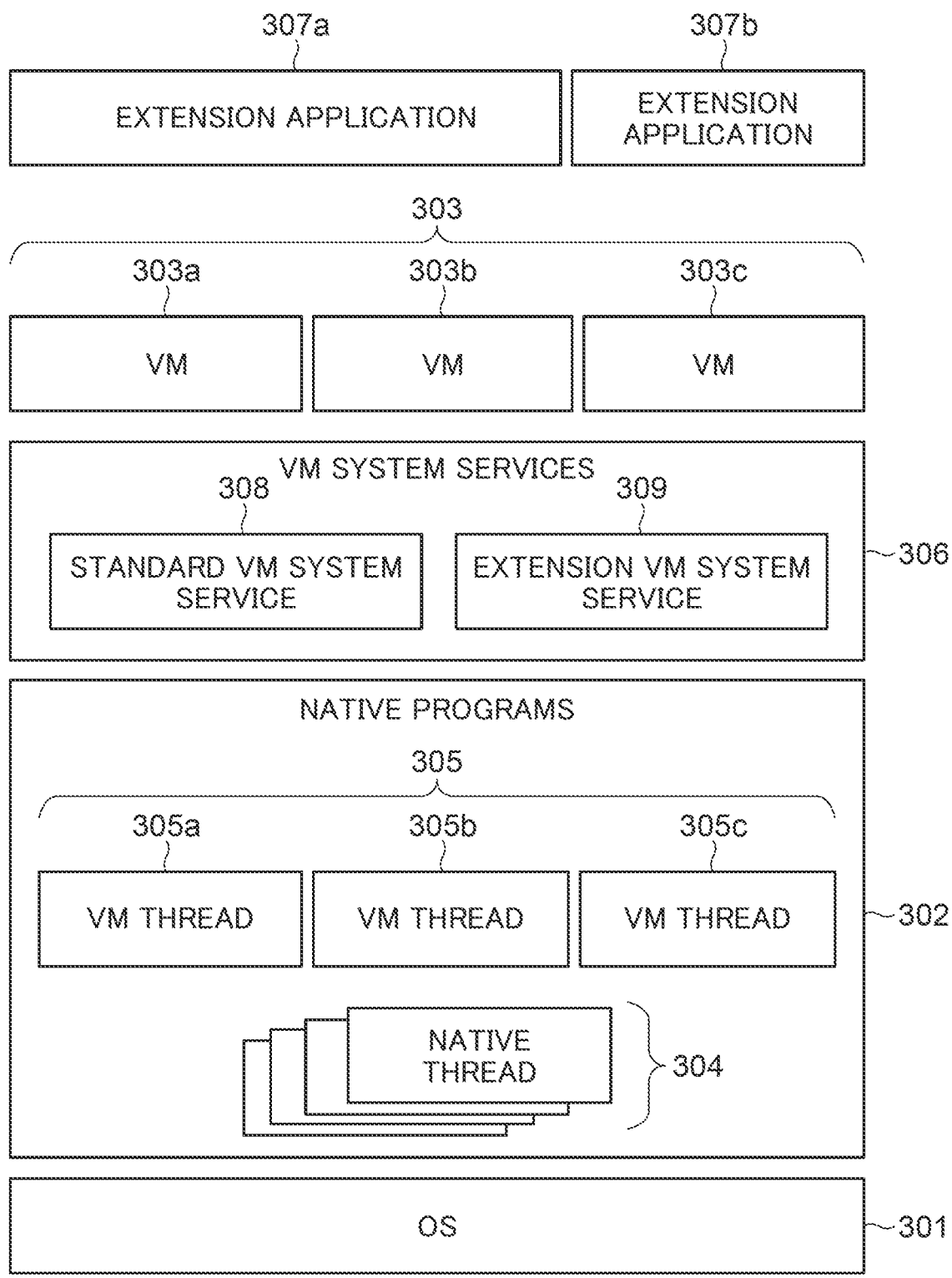
FIG. 3 is a block diagram useful in explaining an example of an execution environment of extension applications in the MFP appearing in FIG. 1.

FIG. 3 is a block diagram useful in explaining an example of an execution environment of extension applications in the MFP 101 appearing in FIG. 1. In the present embodiment, modules, described hereinafter with reference to FIG. 3, are realized on the OS 301 by the CPU 201 executing programs stored in the ROM 203 and the storage 204 after loading them into the RAM 202.

Referring to FIG. 3, native programs 302 realizing the printer function, the FAX function, and the scanner function, and virtual machines (VM) 303 as execution environments for extension applications are operating on the OS 301 started by the CPU 201. Each VM 303 is a module that interprets and executes a program controlling an extension application associated therewith, and necessarily operates on the VM 303.

The native programs 302 include native threads 304 for controlling image processing units, such as the printer 215 and the scanner 214, and VM threads 305 for operating the VMs 303. In the illustrated example, as the VMs 303, there have been generated three VMs: a VM 303a, a VM 303b, and a VM 303c. On the other hand, as the VM threads 305, there have been generated three VM threads: a VM thread 305a, a VM thread 305b, and a VM thread 305c, the number of which corresponds to the number of the total of the VM 303a, the VM 303b, and the VM 303c. VM system services 306 are utility libraries which are commonly used by the extension applications, denoted by 307a and 307b, and provide a plurality of functions. Each of the extension applications 307a and 307b selects a function necessary for executing itself from the VM system services 306. In the MFP 101, the extension applications 307a and 307b are each capable of calling associated function provided by the VM system services 306, thereby saving the time and labor of developing an extension application, and further accessing each associated module of the MFP 101. The VM system services 306 include, as modules, a standard VM system service 308 and an extension VM system service 309. The standard VM system service 308 provides basic service, such as "open", "close", "read" and "write" of a file system of the MFP 101, to thereby realize the minimal functions necessary for each VM 303 to function as the VM. Further, the standard VM system services 308 load scripts which are operation programs of the extension applications 307a and 307b. The extension VM system service 309 realizes access functions for accessing modules of the MFP 101, and functions of the OS 301.

The VMs 303 interpret and execute scripts of the extension applications 307a and 307b. Note that, in the present embodiment, the VMs 303 may be each configured to convert a byte-coded program into a native code and then execute the native code. Each VM 303 is generated in association with each thread of an associated extension application. Under the execution environments shown in FIG. 3, the two VM threads 305a and 305b are generated for the extension application 307a, and the two VMs 303a and 303b are generated in association with the VM threads 305a and 305b, respectively. Also, one VM thread 305c is generated for the extension application 307b, and one VM 303c is generated in association with the VM thread 305c.

Referring again to FIG. 2, icons indicating the extension applications 307a and 307b associated therewith are displayed on the screen of the console section 206 of the MFP 101. When the console section interface 205 detects selection of any of the icons by the user via the console section 206, it transmits information on the selection to the CPU 201. Upon receipt of the information, the CPU 201 starts the extension application 307a or the extension application 307b of which the icon is selected by the user.

Figure 4:
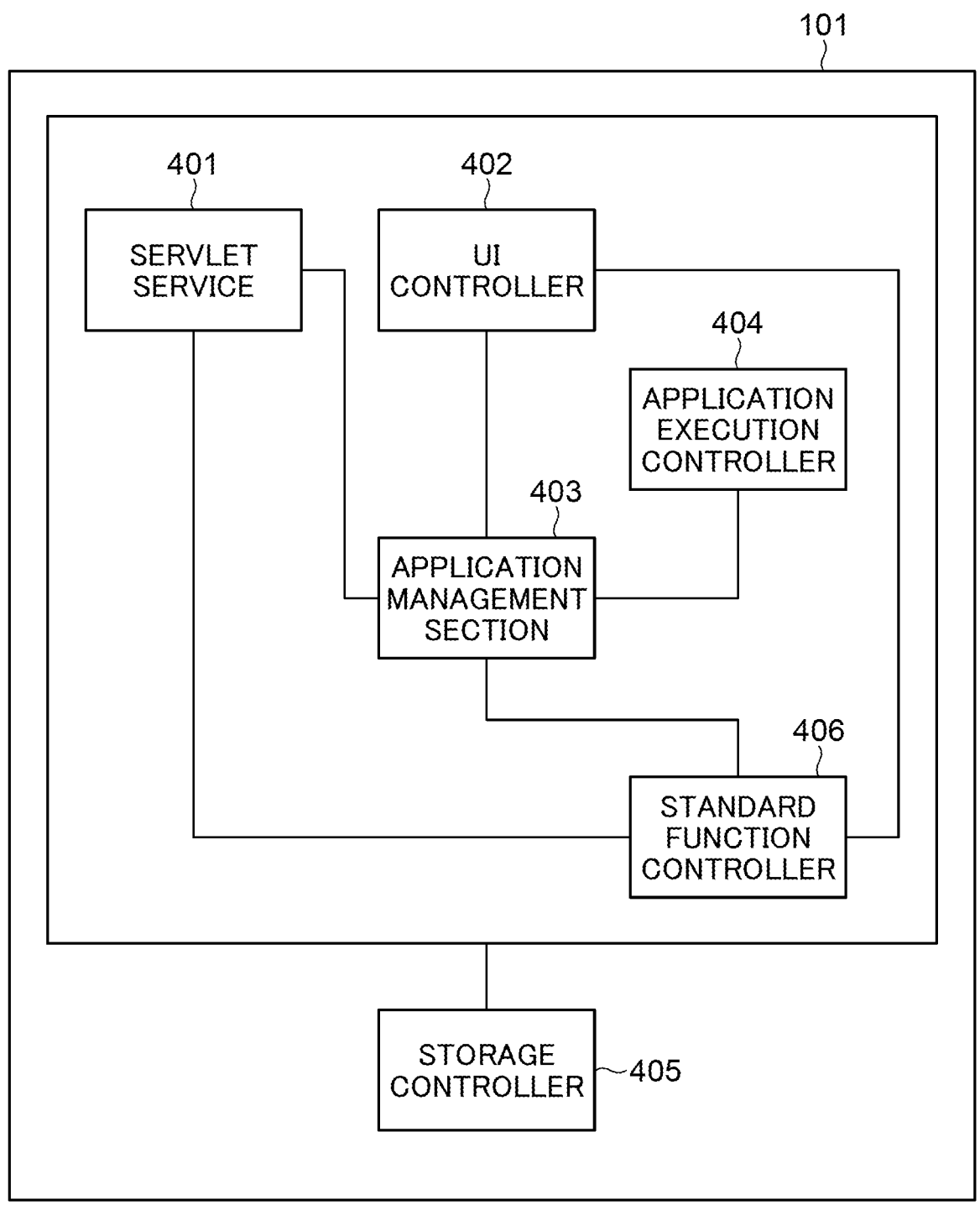
FIG. 4 is a schematic block diagram showing a software configuration of the MFP appearing in FIG. 1.

FIG. 4 is a schematic block diagram showing a software configuration of the MFP 101 appearing in FIG. 1. Referring to FIG. 4, the MFP 101 includes, as modules, a servlet service 401, a UI controller 402, an application management section 403, an application execution controller 404, a storage controller 405, and a standard function controller 406. Processing by each software module is executed by the CPU 201 loading an associated program stored in the ROM 203 or the storage 204 into the RAM 202 and executing the associated program.

The servlet service 401 assigns a processing request received when the external apparatus 103 makes an HTTP access to the MFP 101, to the application management section 403 or the standard function controller 406, according to the URL designated by the external apparatus 103. The UI controller 402 displays a configuration screen for making settings of the MFP 101 on the console section 206. When a user's operation on the configuration screen is received, the UI controller 402 notifies the user's operation to a proper module, specifically, to one of the application management section 403 and the standard function controller 406. The application management section 403 manages the installation of an extension application, and the startup and the like of each application. The application execution controller 404 controls the execution of a started application. Specifically, the application execution controller 404 controls the VMs 303, the VM threads 305, the VM system services 306, and the extension applications 307a and 307b. The storage controller 405 records and manages setting information of the MFP 101. Each module accesses the storage controller 405 to refer to setting values for configuration. The standard function controller 406 controls the copy function, FAX function, and the like, which are standard functions of the MFP 101, and further performs other control necessary for the MFP 101, including the control of the USB host interface 208.

Figure 5A:
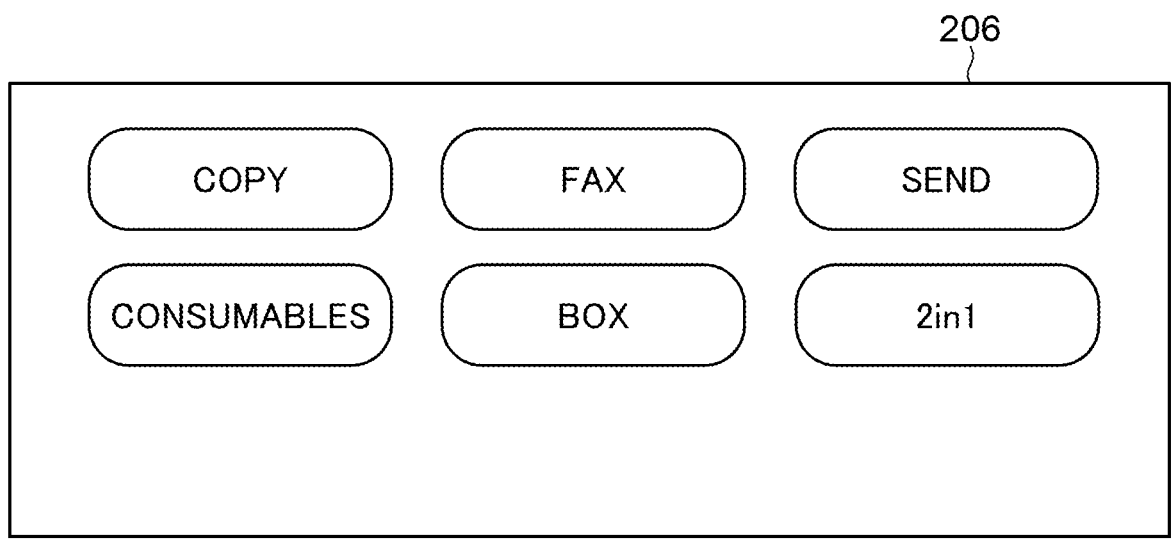
FIGS. 5A and 5B are examples of display of icons on the console section appearing in FIG. 2.
Figure 5B:
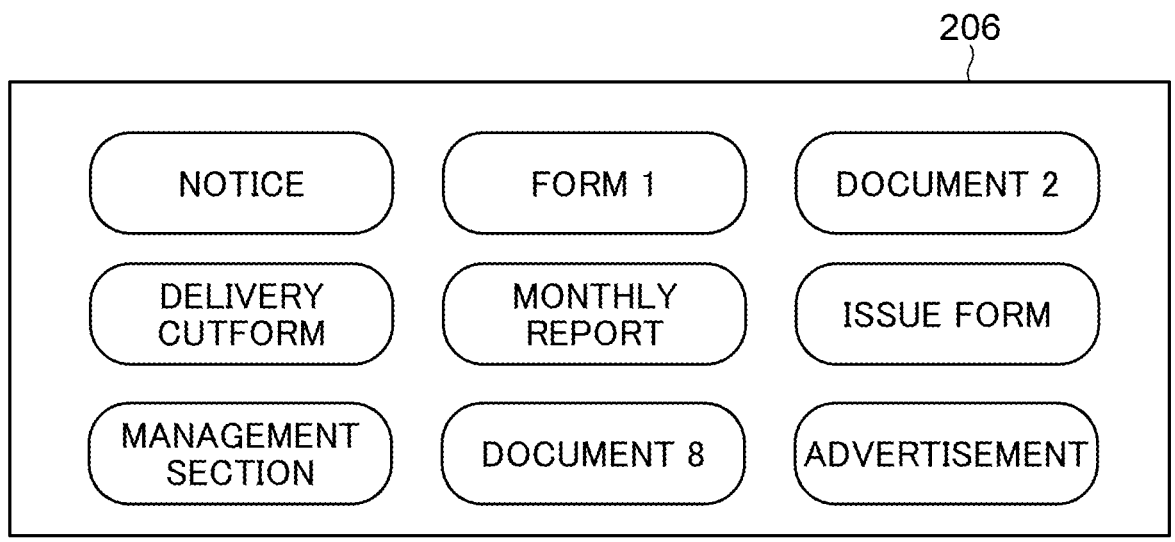

FIGS. 5A and 5B are diagrams showing examples of display of icons on the console section 206 appearing in FIG. 2. The MFP 101 has the standard functions, such as the copy function, the FAX function, and the scan image transmission function, pre-installed thereon as mentioned hereinabove. The console section 206 displays a plurality of icons each for calling a standard function associated therewith. On the other hand, the extension applications 307a and 307b installed on the MFP 101 are each equipped with a one-touch execution function for accepting an instruction given by one-touch operation, for starting printing based on printing execution setting information configured by the user. Note that the execution function is not limited to so-called one-touch execution. There can be envisaged an example in which an instruction for starting execution is given by a touch operation performed a plurality of times (may be performed e.g. two times or three times) within a predetermined time period, such as a mouse double-click operation. The printing execution setting information includes setting information necessary for execution of printing, for example, information concerning print settings, such as the number of copies and a sheet size, information concerning image data to be printed, and information concerning form data when performing form printing. To realize the one-touch execution function, the MFP 101 generates a plurality of icons (hereafter referred to as "processing-specific icons") each associated with a printing process based on associated printing execution setting information, which is to be performed by an associated one of the extension applications 307a and 307b. The MFP 101 displays all the processing-specific icons thus generated on the console section 206. However, if all the processing-specific icons are displayed on the console section 206, as the number of types of the printing execution setting information increases, the number of icons displayed on the console section 206 increases, so that the display of the icons on the console section 206 is messy, e.g. as shown in FIG. 5B. As a result, it takes the user more time and labor to find out a desired icon, which is inconvenient to the user.

To cope with this inconvenience, in the present embodiment, whether to display or not display each processing-specific icon on the console section 206 is switched depending on whether or not preset display conditions are satisfied.

FIG. 6 is an example of an icon configuration screen 600 for configuring settings of each of the extension applications 307a and 307b installed on the MFP 101 appearing in FIG. 1. The icon configuration screen 600 is displayed on the console section 206 or the external apparatus 103 when the user has made a display request thereof, and for example, when the printing request is sent from the external apparatus 103 to the MFP 101, it is displayed on the external apparatus 103. The external apparatus 103 connects to a Web service of the MFP 101 using a Web browser, and displays the icon configuration screen 600 via the Web browser.

The icon configuration screen 600 includes, as setting items, icon name 601, form data 602, icon display 603, data presence 604, delete-after-printing 605, display-only-specific data 606, and print settings 607. The MFP 101 generates a processing-specific icon associated with the settings of the setting items described above.

For the icon name 601, the name of a processing-specific icon to be generated is set. For the form data 602, the name of form data made use of is set. For the icon display 603, one of "permanent display" and "conditional display" can be set. In a case where "permanent display" is set for the icon display 603, the generated processing-specific icon is always displayed on the console section 206. On the other hand, in a case where "conditional display" is set, whether to display or not display the generated processing-specific icon on the console section 206 is determined based on the settings of the data presence 604, the delete-after-printing 605, and the display-only-specific data 606.

For the data presence 604, the user can set one of "ON" and "OFF". In a case where "ON" is set for the data presence 604, whether to display the generated processing-specific icon on the console section 206 is determined based on whether or not image data necessary for execution of the printing process is stored in the storage 204 or the like. On the other hand, in a case where "OFF" is set for the data presence 604, whether to display the generated processing-specific icon on the console section 206 is at least not determined based on whether or not the image data necessary for execution of the printing process is stored in the storage 204 or the like.

For the delete-after-printing 605, the user can set one of "ON" and "OFF". In a case where "ON" is set for the delete-after-printing 605, the generated processing-specific icon is displayed on the console section 206 when it is generated, but is caused to be not displayed thereon when any of predetermined termination conditions is satisfied. The termination conditions include a condition that a predetermined time period elapses after the processing-specific icon is displayed on the console section 206. Further, the termination conditions include a condition that printing using the processing-specific icon has been executed a predetermined number of times. Whether the printing using the processing-specific icon has been executed a predetermined number of times is determined based on a printing history managed by the MFP 101 or the external apparatus 103. In a case where "OFF" is set for the delete-after-printing 605, the generated processing-specific icon continues to be displayed on the console section 206 even after any of the predetermined termination conditions is satisfied.

For the display-only-specific data 606, the name of specific data is set. In a case where the name of specific data is set for the display-only-specific data 606, whether to display the generated processing-specific icon on the console section 206 is determined whether the specific data having the set name is stored in the storage 204 or the like. Thus, in the present embodiment, on the icon configuration screen 600, display conditions of a processing-specific icon are set, and whether to display the processing-specific icon on the console section 206 is switched depending on whether or not the set display conditions are satisfied.

For the print settings 607, common settings concerning printing, such as a sheet size and designation of double-sided printing, are made. Note that the setting items described above are given only by way of example, but the setting items are by no means limited to them. After completing configuration of the above-described setting items on the icon configuration screen 600, when the user presses a "Register" button 608, a processing-specific icon for instructing the start of print processing with the settings made on the icon configuration screen 600 is registered with the storage controller 405. The storage controller 405 manages information on each registered processing-specific icon by using icon management information 700 described hereafter with reference to FIG. 7.

The icon management information 700 includes the items of icon name 701, ID 702, form data 703, print settings 704, icon image data 705, display position 706, icon display setting 707. As the icon name 701, the name of a processing-specific ion set for the icon name 601 which is set on the icon configuration screen 600 is registered. As the ID 702, an ID uniquely assigned to the processing-specific ion is registered, and is used so as to enable the MFP 101 to identify the processing-specific ion when it is pressed. As the form data 703, the name of form data set for the form data 602 is registered. As the print settings 704, the name of settings data including the values set for the print settings 607 is registered. As the icon image data 705, the name of icon image data of the processing-specific icon is registered. As the display position 706, information on the position of the icon on the console section 206, specifically, leading end or trailing end is registered. As the icon display setting 707, the name of settings data including the values of the icon display 603, the data presence 604, the delete-after-printing 605, and the display-only-specific data 606, which are set on the icon configuration screen 600, is registered.

Figure 8:
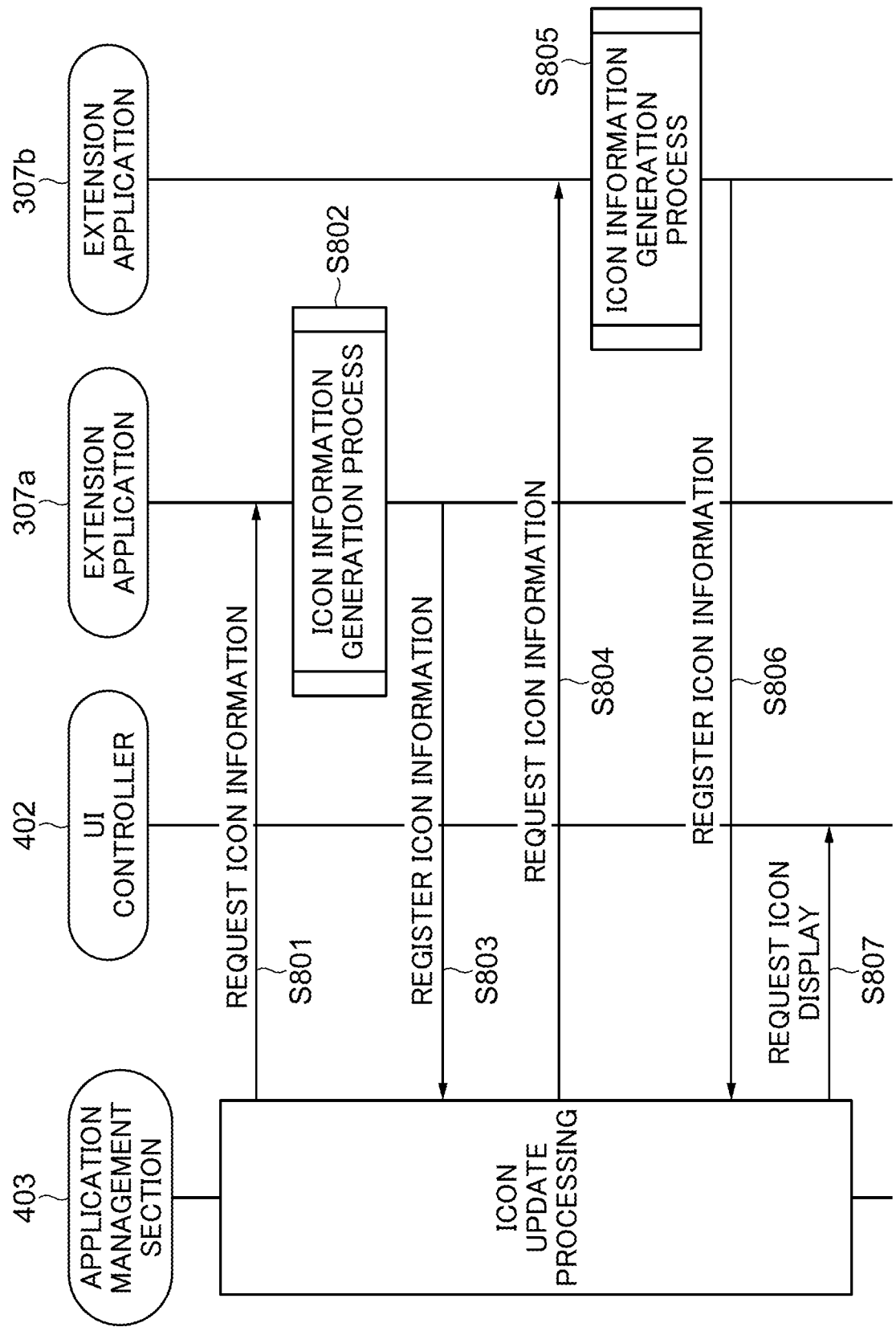
FIG. 8 is a sequence diagram showing a procedure of icon update processing performed by the MFP appearing in FIG. 1.

FIG. 8 is a sequence diagram showing a procedure of icon update processing performed by the MFP 101 appearing in FIG. 1, The icon update processing shown in FIG. 8 is executed, for example, when performing start-up processing or language setting change processing of the MFP 101, enabling/disabling processing of the extension application 307a or 307b, setting change processing of the extension application 307a or 307b, including registration and deletion of image data, and so forth. In the present embodiment, the icon update processing in FIG. 8 is further executed during restoring processing of the MFP 101 from the sleep state or changing processing of the screen displayed on the console section 206, or is periodically executed in response to a timer event, whereby it is possible to perform more flexible icon control.

Referring to FIG. 8, first, the application management section 403 of the MFP 101 makes an icon information request to the extension application 307a (step S801). Upon receipt of the icon information request, the extension application 307a performs an icon information generation process, described hereinafter with reference to FIG. 9 (step S802). In the step S802, the extension application 307a generates icon information indicative of processing-specific icons to be displayed on the console section 206, out of the processing-specific icons of the extension application 307a registered in the icon management information 700. Then, the extension application 307a registers the generated icon information with the application management section 403 (step S803).

Next, the application management section 403 similarly makes an icon information request to the extension application 307b as well (step S804). Upon receipt of the icon information request, the extension application 307b performs the icon information generation process, described hereinafter with reference to FIG. 9 (step S805). In the step S805, the extension application 307b generates icon information indicative of processing-specific icons to be displayed on the console section 206, out of the processing-specific icons of the extension application 307b registered in the icon management information 700. Then, the extension application 307b registers the generated icon information with the application management section 403 (step S806). Then, after completing making icon information requests to all the extension applications installed on the MFP 101, the application management section 403 makes an icon display request to the UI controller 402 based on each acquired icon information (step S807). This causes processing-specific icons of the extension applications 397a and 307b to be displayed on the console section 206.

Figure 9:
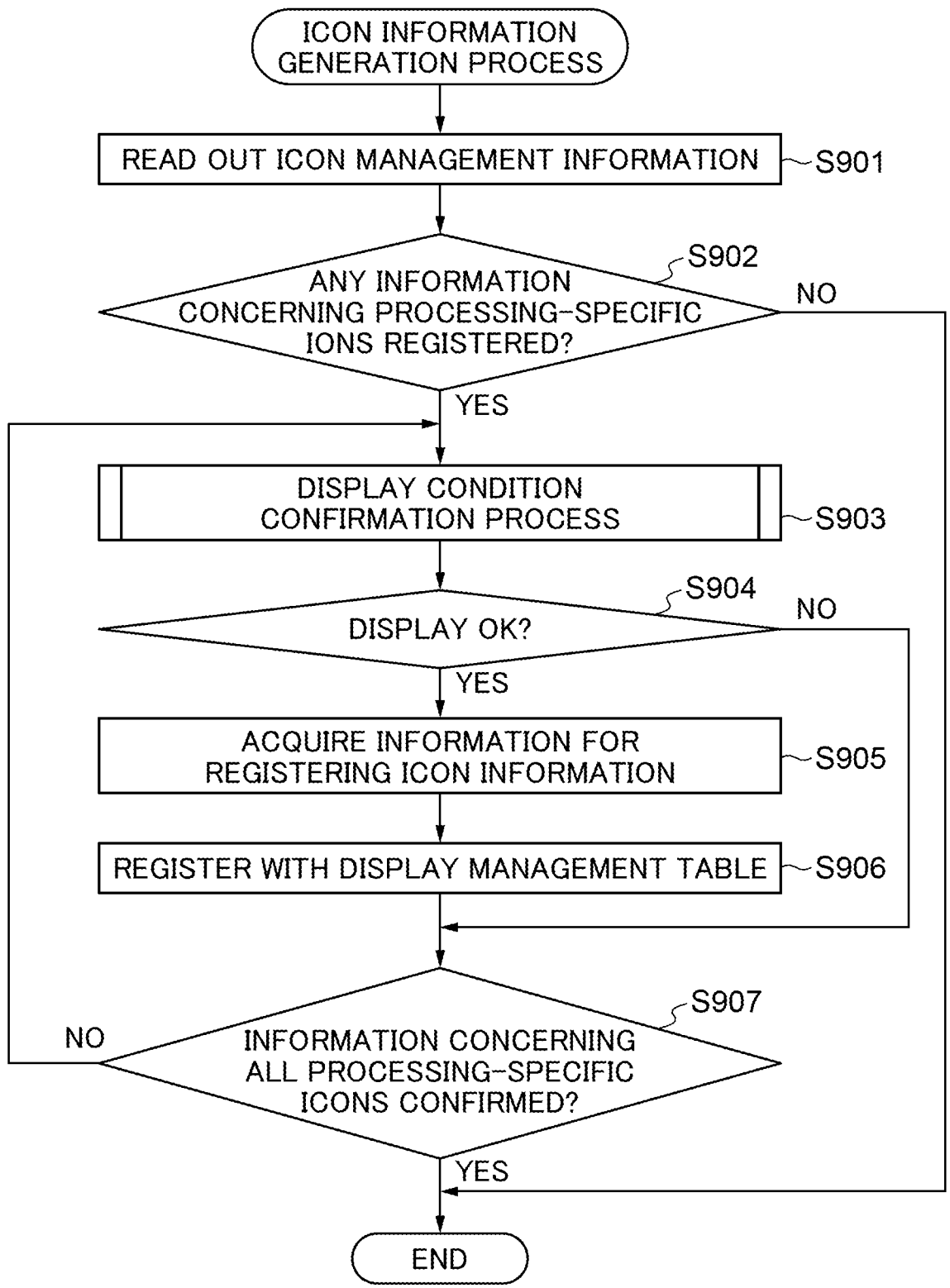
FIG. 9 is a flowchart of an icon information generation process performed in a step in FIG. 8.

FIG. 9 is a flowchart of the icon information generation process performed in the step S802 in FIG. 8. In the present embodiment, each of the extension applications 307a and 307b performs the same icon information generation process, and hence the following description is given, by way of example, of a case where the extension application 307a performs the icon information generation process.

Referring to FIG. 9, the extension application 307a reads out the icon management information 700 (step S901), and determines whether or not any information concerning processing-specific ions is registered in the icon management information 700 (step S902).

If it is determined in the step S902 that no information concerning processing-specific ions is registered in the icon management information 700, the extension application 307a terminates the present process. On the other hand, if it is determined in the step S902 that any information concerning processing-specific ions is registered in the icon management information 700, the extension application 307a identifies information on a processing-specific icon of e.g. "Form 1" out of the icon management information 700. Then, the extension application 307a performs a display condition confirmation process, described hereinafter with reference to FIG. 11 on the identified information on the processing-specific icon of "Form 1" (step S903) to thereby confirm whether the display conditions of the processing-specific icon of "Form 1" are satisfied. Then, the extension application 307a determines, based on a result of determination in the step S903, whether or not the display of the processing-specific icon of "Form 1" is OK (allowed) (step S904).

If it is determined in the step S904 that the display of the processing-specific icon of "Form 1" is NG (not allowed), the extension application 307a proceeds to a step S907, described hereinafter, whereas if it is determined in the step S904 that the display of the processing-specific icon of "Form 1" is OK, the extension application 307a acquires information for registering icon information of the processing-specific icon of "Form 1" (step S905). Specifically, the extension application 307a acquires the values of the ID 702, the icon image data 705, and the display position 706 from the information concerning the processing-specific icon of "Form 1". Next, the extension application 307a registers the acquired values of the ID 702, the icon image data 705, and the display position 706 with a display management table 1000, described hereinafter with reference to FIG. 10, as the icon information of the processing-specific icon of "Form 1" (step S906). Specifically, the extension application 307a registers "1" which is an ID indicative of the extension application 307a as an application ID 1001, and "0" which is set for the ID 702 of "Form 1" as an ID 1002. Further, the extension application 307a registers "Form 1" which is the name of the icon as an icon title 1003, and "leading end" set for the display position 706 of "Form 1" as a display position 1004. Further, the extension application 307a registers pixel data of "Icon1.data" which is set for the icon image data 705 of "Form 1" as icon image information 1005. Then, the extension application 307a determines whether or not information concerning all of the processing-specific icons of the extension application 307a registered in the icon management information 700 has been confirmed (step S907).

If it is determined in the step S907 that confirmation of the information concerning all of the processing-specific icons of the extension application 307a registered in the icon management information 700 has not been completed, the extension application 307a returns to the step S903. For example, the extension application 307a identifies information on a processing-specific icon of "Delivery Slip" registered next to "Form 1" out of the information concerning the processing-specific icons of the extension application 307a registered in the icon management information 700. Then, the extension application 307a executes processing in the step S903 et seq.

If it is determined in the step S907 that confirmation of the information concerning all of the processing-specific icons of the extension application 307a registered in the icon management information 700 has been completed, the extension application 307a terminates the present process.

Figure 11:
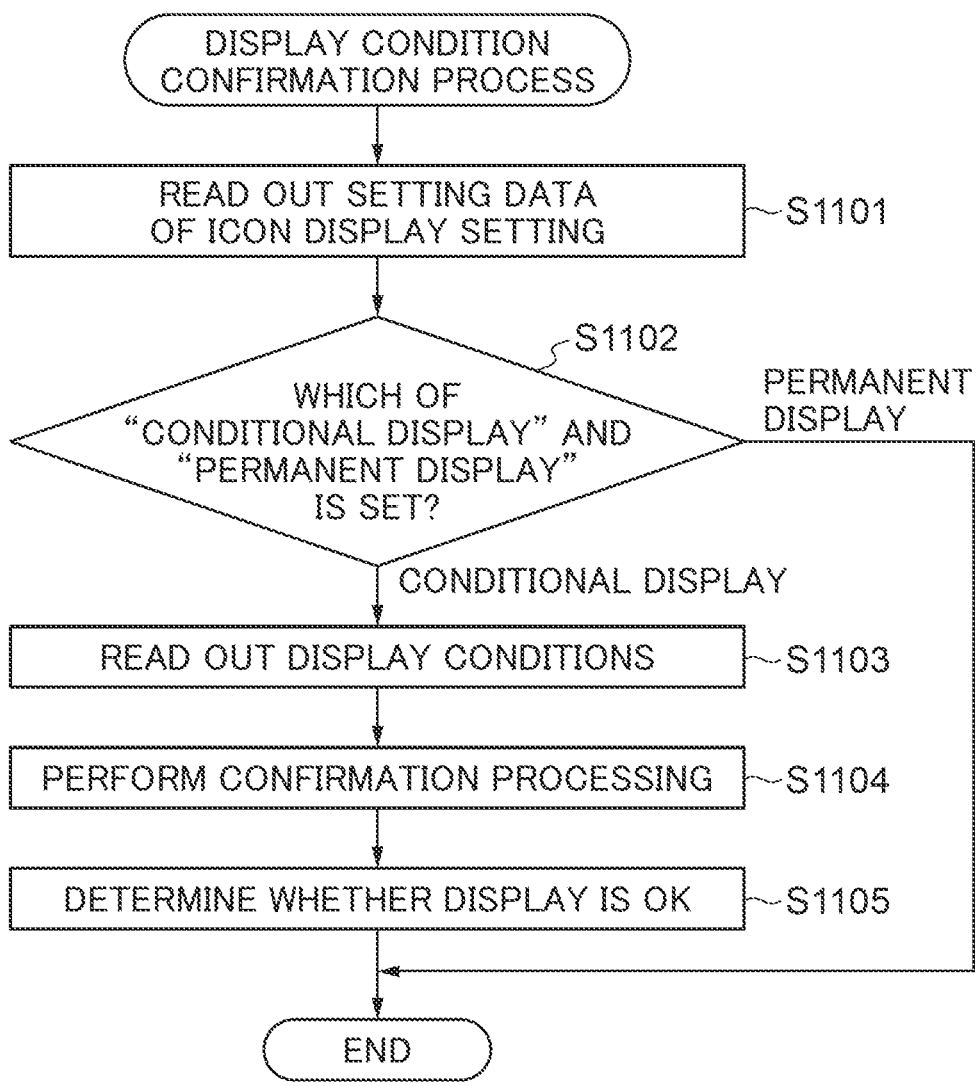
FIG. 11 is a flowchart of a display condition confirmation process performed in a step in FIG. 9.

FIG. 11 is a flowchart of the display condition confirmation process performed in the step S903 in FIG. 9.

Referring to FIG. 11, the extension application 307a reads out settings data set for the icon display setting 707 from the information concerning the processing-specific icon of "Form 1" (step S1101), and confirms the setting value of the icon display 603 in the read settings data. Specifically, the extension application 307a confirms which of "conditional display" and "permanent display" is set (step S1102).

If it is determined in the step S1102 that "permanent display" is set, the extension application 307a terminates the present process. On the other hand, if it is determined in the step S1102 that "conditional display" is set, the extension application 307a reads out display conditions of the processing-specific icon of "Form 1" (step S1103). Specifically, the extension application 307a reads out the setting values of the data presence 604, the delete-after-printing 605, and the display-only-specific data 606 from the information concerning the processing-specific icon of "Form 1". Then, the extension application 307a performs confirmation processing for confirming whether the display conditions of the processing-specific icon of "Form 1" defined by the setting values read in the step S1103 are satisfied (step S1104). Next, whether or not the display of the processing-specific icon of "Form 1" is OK is determined by the extension application 307a based on a result of the confirmation processing (step S1105)

For example, in a case where the data presence 604 in the information concerning the processing-specific icon of "Form 1" is set to "ON", the extension application 307a confirms in the step S1104 whether the processing-specific icon of "Form 1" satisfies the conditions defined by this setting. Specifically, the extension application 307a confirms whether image data necessary for print processing associated with the processing-specific icon of "Form 1" is stored in the storage 204 or the like. If the image data is stored in the storage 204 or the like, the extension application 307a determines in the step S1105 that the display of the processing-specific icon of "Form 1" is OK. On the other hand, if the image data is not stored in the storage 204 or the like, the extension application 307a determines in the step S1105 that the display of the processing-specific icon of "Form 1" is NG.

Further, in a case where the delete-after-printing 605 in the information concerning the processing-specific icon of "Form 1" is set to "ON", the extension application 307a confirms in the step S1104 whether the processing-specific icon of "Form 1" satisfies the conditions defined by this setting. Specifically, the extension application 307a confirms whether or not any of the termination conditions including the condition that the predetermined time period has elapsed after the generated processing-specific icon is displayed on the console section 206, and the condition that printing using the generated processing-specific icon has been executed the predetermined number of times. If none of the termination conditions are satisfied, the extension application 307a determines in the step S1105 that the display of the processing-specific icon of "Form 1" is OK. On the other hand, if any of the termination conditions is satisfied, the extension application 307a determines in the step S1105 that the display of the processing-specific icon of "Form 1" is NG.

Figure 12:
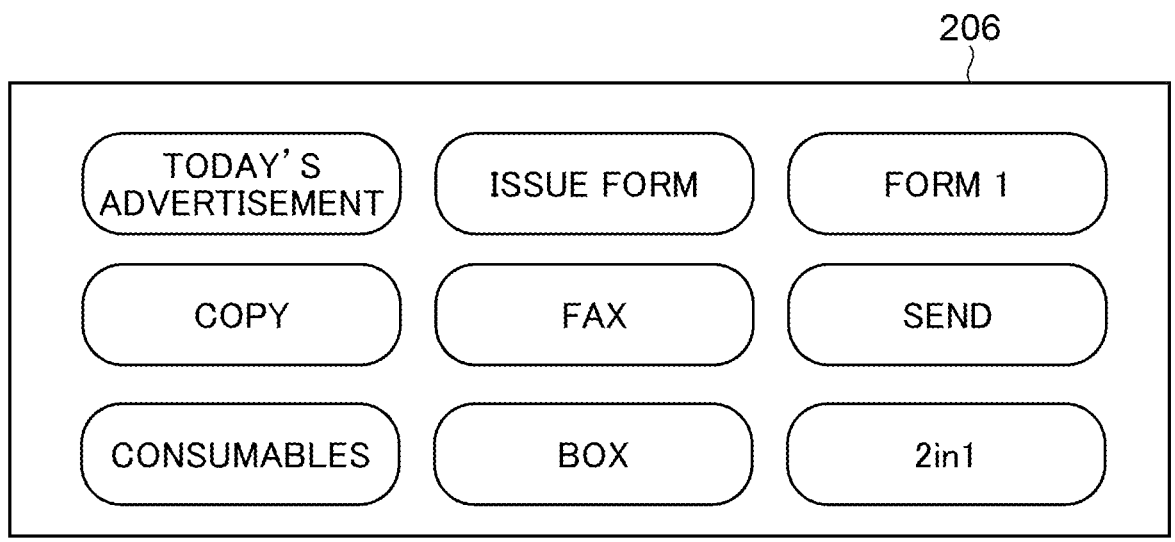
FIG. 12 is a diagram showing an example of display of icons on the console section appearing in FIG. 2.

In a case where the data name of specific data is set in the setting box of the display-only-specific data 606 in the information concerning the processing-specific icon of "Form 1", the extension application 307a confirms in the step S1104 whether the processing-specific icon of "Form 1" satisfies the conditions defined by this setting. Specifically, the extension application 307a confirms whether or not the specific data is stored in the storage 204 or the like. If the specific data is stored in the storage 204 or the like, the extension application 307a determines in the step S1105 that the display of the processing-specific icon of "Form 1" is OK. On the other hand, if the specific data is not stored in the storage 204 or the like, the extension application 307a determines in the step S1105 that the display of the processing-specific icon of "Form 1" is NG. Then, the extension application 307a terminates the present process, and executes processing in the step S904 et seq. of the icon information generation process in FIG. 9. In the present embodiment, out of the information concerning the processing-specific icons registered in the icon management information 700, only information concerning processing-specific icons of which the display is determined to be OK in the step S1105 is registered in the display management table 1000. The MFP 101 reads out information items concerning respective processing-specific icons in the order of registration in the display management table 1000, and the registered processing-specific icons are displayed as shown in FIG. 12.

According to the embodiment described heretofore, the display and non-display of each processing-specific icon on the console section 206 are switched based on whether the display conditions set therefor are satisfied. This makes it possible to suppress unnecessary icons from being displayed on the console section 206, thereby making it possible to prevent the display on the console section 206 from being messy.

Further, according to the above-described embodiment, display conditions are set by a user on the icon configuration screen 600. This makes it possible to cause user's intention to be reflected on the display or non-display of each processing-specific icon.

Further, according to the above-described embodiment, in a case where image data necessary for executing associated print processing is stored, a processing-specific icon associated with the print processing is displayed on the console section 206, whereas in a case where no image data necessary for executing the associated print processing is stored, the processing-specific icon associated with the print processing is not displayed on the console section 206. Further, in a case where specific data designated by the user is stored, a processing-specific icon associated with the specific data is displayed on the console section 206, whereas in a case where no specific data designated by the user is stored, the processing-specific icon associated with the specific data is not displayed on the console section 206. In short, only in cases where associated print processing can be executed, a processing-specific icon associated with the print processing is displayed on the console section 206. This makes it possible to suppress the console section 206 from displaying processing-specific icons associated with print processing which is not ready to be executed.

According to the above-described embodiment, after a processing-specific icon is generated, the processing-specific icon is displayed on the console section 206 until the predetermined time period elapses, or until print processing associated with the processing-specific icon is executed the predetermined number of times. This makes it possible to prevent the generated processing-specific icon from unnecessarily continuing to be displayed on the console section 206.

Further, according to the above-described embodiment, the MFP 101 is a printing apparatus that performs form printing. This makes it possible to prevent the display on the console section 206 from being messy in a case where the extension applications 307a and 307b are installed which generate a plurality of processing-specific icons for each of different form data items used for form printing.

The invention has been described heretofore referring to the embodiment described above. However, the invention is not limited to the above-described embodiment. For example, in a case where image data necessary for executing print processing associated with a processing-specific icon is deleted from the external apparatus 103 designated by the user as a storage location, the processing-specific icon may be caused not to be displayed on the console section 206.

FIG. 13 is a variation of the icon configuration screen 600 shown in FIG. 6. Referring to FIG. 13, an icon configuration screen 1300 includes, as setting items, file path 1301, in addition to the icon name 601, icon display 603, data presence 604, delete-after-printing 605, display-only-specific data 606, and print settings 607. For the file path 1301, there is set a path to a location in the external apparatus 103 or another file server, where image data necessary for executing print processing associated with the generated processing-specific ion is stored. Information concerning the processing-specific icon for which the file path 1301 is set is registered in icon management information 1400 shown in FIG. 14. The setting value of the file path 1301 is registered in a file path 1401 of the icon management information 1400.

FIG. 15 is a sequence diagram showing a procedure of icon deletion processing performed by the printing system 100 shown in FIG. 1. The icon deletion processing shown in FIG. 15 is performed assuming that a path indicating the external apparatus 1301, for example, is set in the file path 1301 of the icon configuration screen 1300. Image data necessary for print processing by the extension application 307b is stored in the external apparatus 103, and one processing-specific icon for executing the print processing is displayed on the console section 206.

Referring to FIG. 15, if the image data necessary for executing the print processing associated with the one processing-specific icon is deleted from the external apparatus 103 by the user, the external apparatus 103 notifies the MFP 101 of deletion of the image data (step S1501). Upon receipt of this notification, the application management section 403 of the MFP 101 makes an icon information request to the extension application 307b (step S1502). Upon receipt of the icon information request, the extension application 307b performs the icon information generation process described hereinabove with reference to FIG. 9. Since the image data has been deleted from the external apparatus 103, the extension application 307b instructs the application management section 403 to delete information on the one processing-specific icon so as to cause the one processing-specific icon not to be displayed on the console section 206 (step S1503). Note that the present embodiment may be configured such that the extension application 307b may instruct the application management section 403 to delete the information on the one processing-specific icon based on the notification received from the external apparatus 103, without performing the icon information generation process in FIG. 9. Upon receipt of the instruction, the application management section 403 makes a request for deleting the one processing-specific icon to the UI controller 402 (step S1504). This causes the one processing-specific icon not to be displayed on the console section 206.

According to the above-described embodiment, in a case where image data necessary for executing print processing is deleted from the external apparatus 103, an icon associated with the print processing is caused not to be displayed on the console section 206. This makes it possible to suppress the console section 206 from displaying a processing-specific icon associated with such print processing as acquires image data necessary for execution thereof from the external apparatus 103, in a state in which the print processing is not ready to be executed.

Further, according to the above-described embodiment, the user makes settings of the icon display 603, but this is not limitative. For example, according to functions of an extension application, the MFP 101 may automatically set the icon display 603 to one of "conditional display" and "permanent display". For example, in a case where a plural icon display application capable of generating a plurality of icons on processing basis, such as the extension applications 307a and 307b, is installed, when generating each processing-specific icon associated with the plural icon display application, generation of the icon is performed assuming that "conditional display" is set. In doing this, as a display condition of the processing-specific icon, the delete-after-printing 605, for example, is automatically set to "ON". That is, irrespective of the settings on the icon configuration screen 600, display and non-display of each processing-specific icon associated with the plural icon display application are switched based on predetermined conditions. This makes it possible to prevent display on the console section 206 from being messy even without the user making settings on the icon configuration screen 600.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-242856 filed Dec. 19, 2017, which is hereby incorporated by reference herein in its entirety.

What is claimed is:

1. A control apparatus in which an application is installable, comprising:
one or more processors; and
one or more memories including instructions that, when executed by the one or more processors, cause the one or more processors to function as:
a register unit configured to register a print setting, the print setting being associated with a display item configured to receive an operation for executing the application;
a display control unit configured to perform control of display of the display item on an operation unit; and
a printing unit configured to perform printing, in accordance with an operation on the display item, of print data selected from among data stored in a predetermined storage area of the one or more memories, based on the print setting,
wherein the display control unit controls (i) to display the display item on the operation unit in a case where data capable of being printed using the application is stored in the predetermined storage area and (ii) not to display the display item on the operation unit in a case where data capable of being printed using the application is not stored in the predetermined storage area.

2. The control apparatus according to claim 1, wherein the one or more memories further include instructions that, when executed by the one or more processors, cause the one or more processors to function as a setting unit configured to cause a user to set one or more conditions related to display of the display item on the operation unit.

3. The control apparatus according to claim 1,
wherein the display control unit further controls to display another display item on the operation unit in a case where specific data designated by a user and associated with the another display item is stored and to not display the another display item on the operation unit in a case where the specific data is not stored.

4. The control apparatus according to claim 1, wherein the display control unit causes the display item not to be displayed on the operation unit in a case where data capable of being printed using the application is deleted from an external device designated by a user.

5. The control apparatus according to claim 1, wherein the control apparatus is a printing apparatus that performs form printing.

6. The control apparatus according to claim 1, wherein in a case where a plural display item display application configured to display a plurality of display items associated therewith is installed in the control apparatus, the display control unit controls whether or not to display each of the plurality of display items associated with the plural display item display application.

7. The control apparatus according to claim 1, wherein the application is equipped with a function for receiving an instruction for executing the application by a one-touch operation on the display item associated with the print setting.

8. A control apparatus in which an application is installable, comprising:
one or more processors; and
one or more memories including instructions that, when executed by the one or more processors, cause the one or more processors to function as:
a register unit configured to register a print setting, the print setting being associated with a display item configured to receive an operation for executing the application;
a display control unit configured to perform control of display of the display item on an operation unit; and
a printing unit configured to perform printing, in accordance with an operation on the display item, of print data selected from among data stored in a predetermined storage area of the one or more memories, based on the print setting,
wherein the display control unit controls (i) to display the display item on the operation unit in a case where the number of times of execution of printing based on an operation on the display item is less than a predetermined number and (ii) not to display the display item on the operation unit in a case where the number of times of execution of printing based on an operation on the display item has reached the predetermined number.

9. A method of controlling a control apparatus in which an application is installable, comprising:
registering a print setting, the print setting being associated with a display item configured to receive an operation for executing the application;
performing control of display of the display item on an operation unit; and
printing, in accordance with an operation on the display item, print data selected from among data stored in a predetermined storage area of the one or more memories, based on the print setting,
wherein the performing control of display of the display item includes controlling (i) to display the display item on the operation unit in a case where data capable of being printed using the application is stored in the predetermined storage area and (ii) not to display the display item on the operation unit in a case where data capable of being printed using the application is not stored in the predetermined storage area.

10. A non-transitory computer-readable storage medium storing a computer-executable program for executing a method of controlling a control apparatus in which an application is installable,
wherein the method comprises:
registering a print setting, the print setting being associated with a display item configured to receive an operation for executing the application;
performing control of display of the display item on an operation unit; and
printing, in accordance with an operation on the display item, print data selected from among data stored in a predetermined storage area of the one or more memories, based on the print setting,
wherein the performing control of display of the display item includes controlling (i) to display the display item on the operation unit in a case where data capable of being printed using the application is stored in the predetermined storage area and (ii) not to display the display item on the operation unit in a case where data capable of being printed using the application is not stored in the predetermined storage area.

11. A method of controlling a control apparatus in which an application is installable, comprising:
registering a print setting, the print setting being associated with a display item configured to receive an operation for executing the application;
performing control of display of the display item on an operation unit; and
printing, in accordance with an operation on the display item, print data selected from among data stored in a predetermined storage area of the one or more memories, based on the print setting,
wherein the performing control of display of the display item includes controlling (i) to display the display item on the operation unit in a case where the number of times of execution of printing based on an operation on the display item is less than a predetermined number and (ii) not to display the display item on the operation unit in a case where the number of times of execution of printing based on an operation on the display item has reached the predetermined number.

* * * * *